United States Patent

McNulty

[15] 3,681,988

[45] Aug. 8, 1972

[54] MANHOLE FLOWMETER

[72] Inventor: Carrell S. McNulty, 35 Beulah Road, New Britain, Pa.

[22] Filed: Aug. 20, 1971

[21] Appl. No.: 173,541

[52] U.S. Cl. .......................73/194 R, 73/215, 73/313
[51] Int. Cl. .......................G01f 1/00, G01f 23/10
[58] Field of Search ............73/194 R, 313, 317, 215; 338/33

[56] References Cited

UNITED STATES PATENTS

| 1,641,491 | 9/1927 | Hyland ....................73/313 X |
| 3,124,000 | 3/1964 | Melas .........................73/215 |
| 2,575,616 | 11/1951 | De Giers et al. .........73/313 X |

FOREIGN PATENTS OR APPLICATIONS

| 56,116 | 4/1891 | Germany ....................73/313 |
| 212,115 | 4/1967 | Sweden .......................73/215 |

Primary Examiner—James J. Gill
Assistant Examiner—John P. Beauchamp
Attorney—Dexter N. Shaw, Charles H. Howson, Jr., John W. Logan, Jr., Roger W. Herrell, Henry Howson Skillman, John C Worfman, Gordon S. Rogers, Charles M. Allen, Albert L. Free, Eugene E. Renz and Richard D. Weber

[57] ABSTRACT

Apparatus is provided to measure changes in the elevation of a stream of fluid flowing in an open channel for use in computing the rate and/or quantity of fluid flow. The apparatus comprises a hollow cylindrical housing mounted by means of a bracket assembly to pivot on an axis transverse to the stream and an arm connected at one end of the housing and mounting at its other end a float which rides upon the surface of the fluid. The float and arm cause the housing to pivot in response to changes in elevation of the fluid, and a variable resistor fixedly mounted inside the housing cooperates with a pendulous mass mounted on the shaft of the resistor to produce an electrical signal when the housing pivots about the shaft and the mass. The signal from the resistor is fed into recording and computation instrumentation to yield the desired readout.

9 Claims, 11 Drawing Figures

PATENTED AUG 8 1972
3,681,988
SHEET 1 OF 2
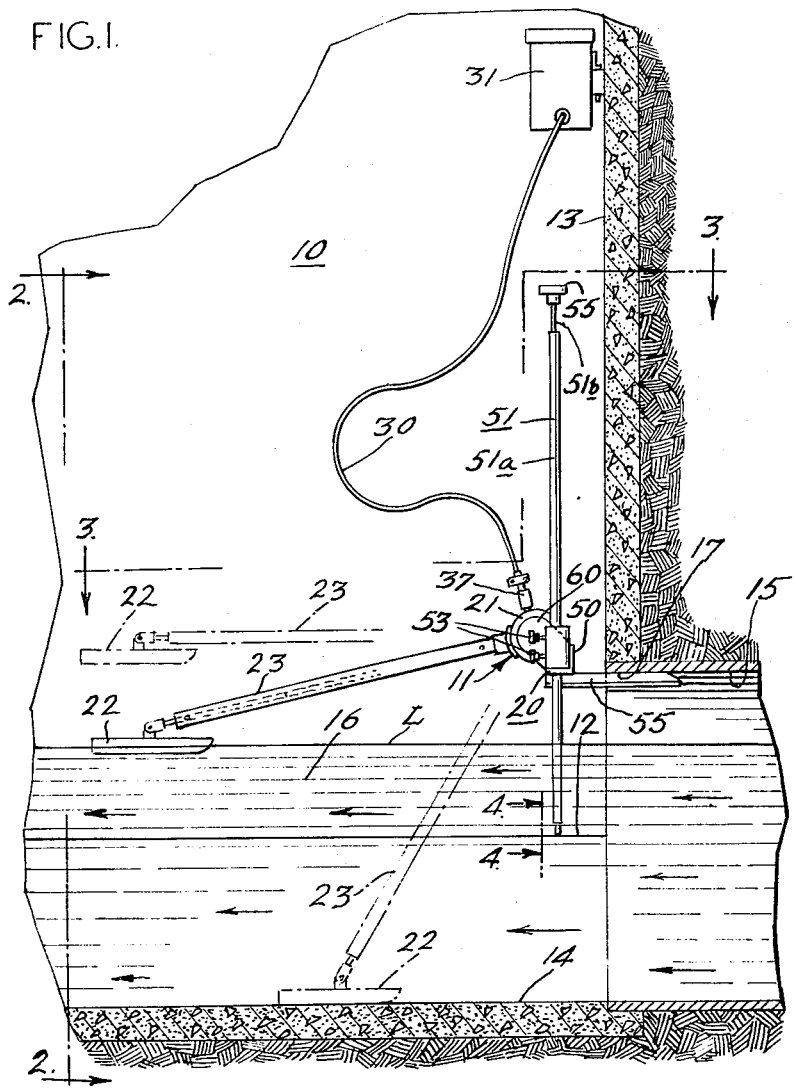
FIG.1.
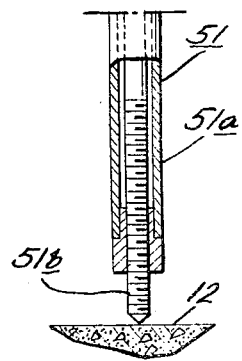
FIG.4.
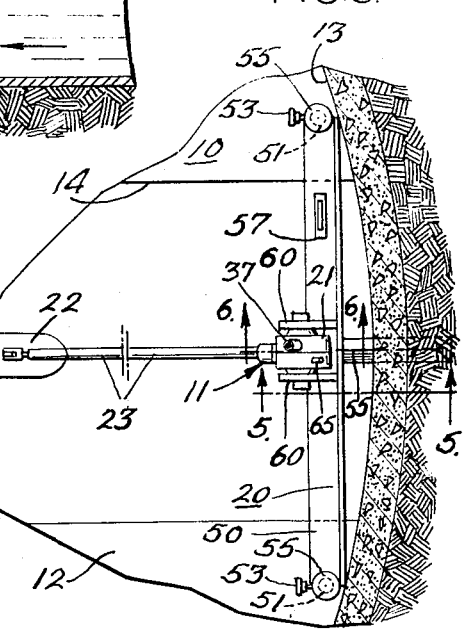
FIG.3.
FIG.2.
INVENTOR:
CARRELL S. McNULTY
BY Howson & Howson
ATTYS.

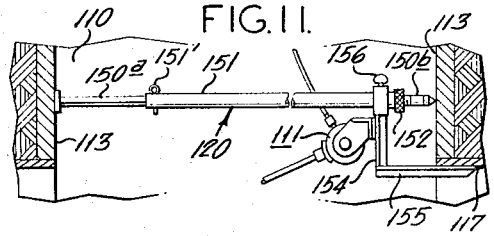
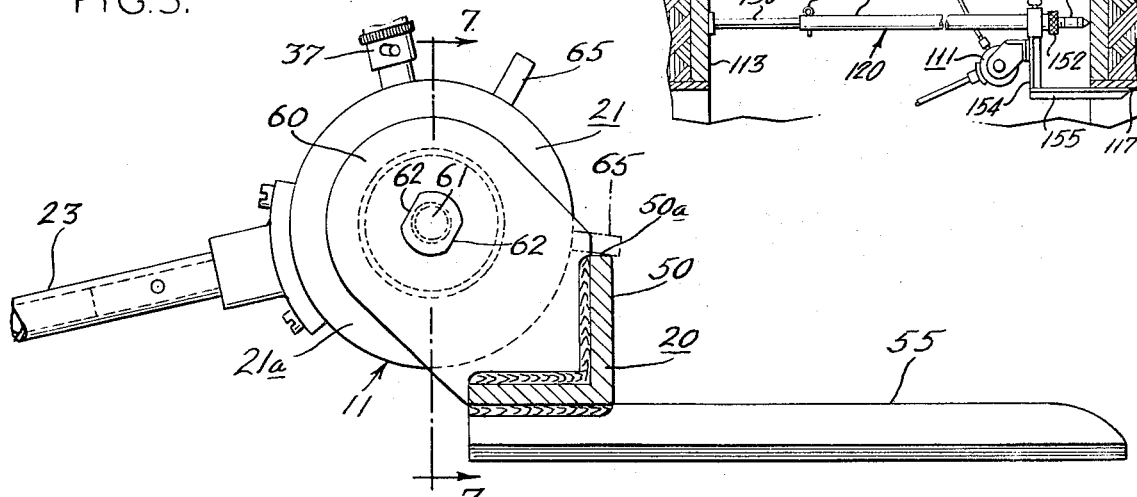
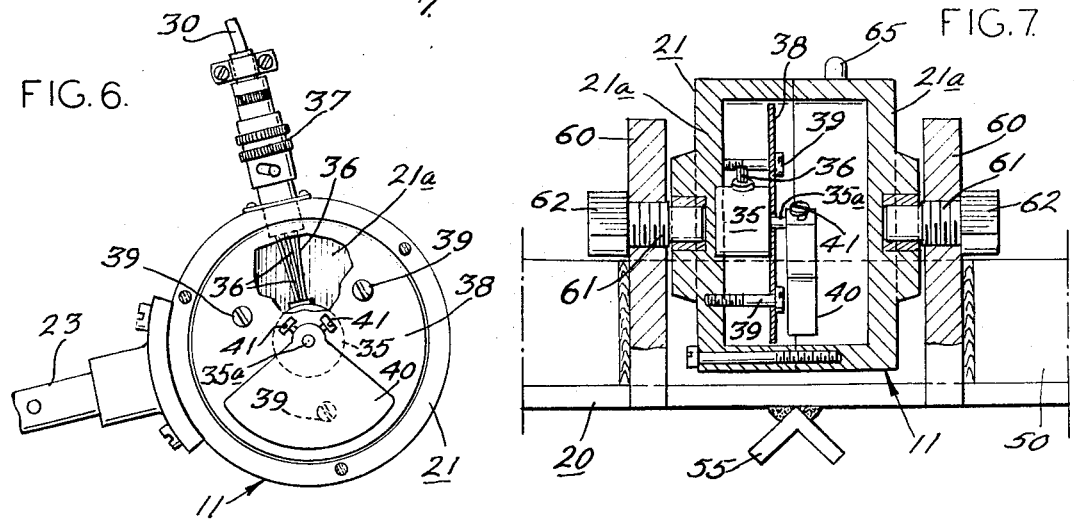
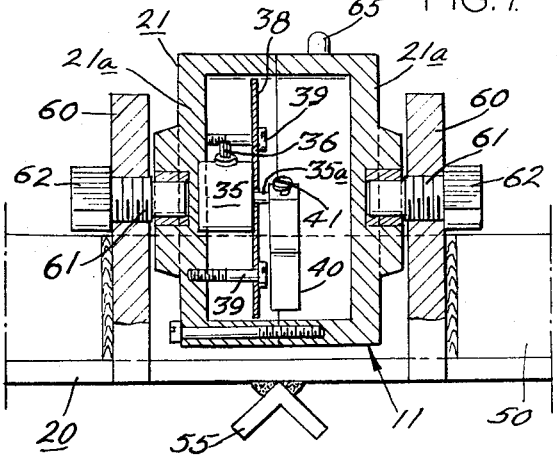
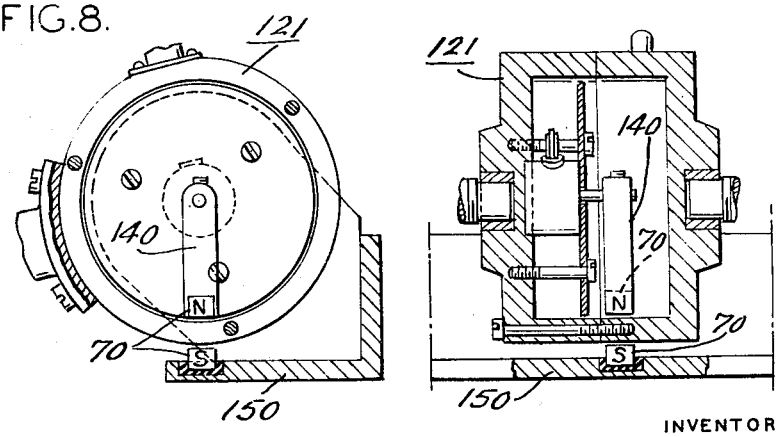
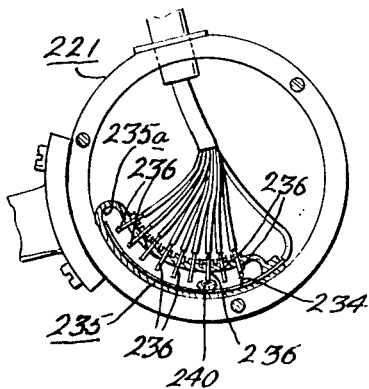
INVENTOR:
CARRELL S. McNULTY
BY Howson & Howson
ATTYS.

MANHOLE FLOWMETER

The present invention relates to flowmeters, and more particularly, the present invention relates to apparatus for use in measuring the rate and/or quantity of flow of fluid in an open channel.

At present, apparatus is available for use in measuring the rate at which fluid flows through a manhole and for computing total flow from the measurements. One form of apparatus employs a vertically-disposed capacitance tube to measure the elevation of fluid in a stilling well in the manhole. Although the capacitance tube apparatus operates satisfactorily, there is a tendency for paper, grease and like foreign matter to affect adversely the accuracy of the measurements. Accuracy is presently assured only by periodic cleaning of the capacitance tubes.

Another type of flowmeter which has been employed to measure fluid flow rates is disclosed in U. S. Pat. No. 3,124,000. In this apparatus, a float arm is connected to a pivot shaft which is rotatable in a fixed housing to provide an electrical signal in response to changes in elevation, and hence, rate of fluid flow in an open channel. One end of the shaft extends outside the housing, and a seal is provided around the shaft to maintain the housing fluid-tight. Although the patented apparatus may operate satisfactorily, it is not as readily installed as desirable; nor is this apparatus of such simple construction as to be manufactured and maintained in operation economically. Moreover, the corrosive nature of the fluid being measured has a degrading effect on moving parts and seals; hence, apparatus which has a minimum of such parts exposed to the fluid is highly desirable.

With the foregoing in mind, it is a primary object of the present invention to provide a unique open-channel flowmeter which yields accurate flow measurements but which requires a minimum of maintenance.

As a further object, the present invention provides improved open-channel flowmeter apparatus which is relatively economical to manufacture and simple to install.

Another object of the present invention is to provide a self-contained flowmeter unit which is completely sealed to protect moving and operating parts from the degrading effect of a corrosive environment.

More specifically, in the present invention, the rate at which fluid flows in an open channel in an enclosure is measured by means of apparatus which detects changes in the elevation of the flowing fluid and which operates in conjunction with electronic instrumentation to provide a readout of the fluid flow rate and/or a computation of total flow. The apparatus comprises a hollow, fluid-tight housing mounted by means of a bracket assembly to pivot on an axis transverse to the channel in response to changes in the elevation of the flow stream. The bracket assembly includes a horizontally-disposed frame member which mounts at each end vertically-adjustable depending legs and which mounts centrally a tongue for engaging in an aperture in the enclosure to secure the apparatus in operating relation therein. The housing is pivoted on its axis by means of an arm which is connected at one end to the housing and which mounts at its other end a float which rides upon the surface of the fluid downstream of the housing. A rotary electrical device having a stator and a rotor is fixedly mounted inside the housing so that its stator pivots with the housing, and a detector for a vertical datum line depends pendulously from a shaft on the rotor to maintain the rotor in a stationary position as the housing and the stator pivot in response to changes in the elevation of the stream. Thus, an electrical signal corresponding to the change in elevation of the flowing fluid is supplied to the instrumentation.

These and other objects, features and advantages of the present invention should become apparent from the following description when taken in conjunction with the accompanying drawings in which:

FIG. 1 is a sectional view of a conventional manhole in which is mounted flow measuring apparatus embodying the present invention;

FIG. 2 is a sectional view taken along line 2—2 of FIG. 1 to illustrate a bracket assembly which mounts a housing to which a float arm is connected;

FIGS. 3 and 4 are sectional views taken along lines 3—3 and 4—4, respectively, of FIG. 1;

FIGS. 5 and 6 are enlarged sectional views of the housing taken along lines 5—5 and 6—6, respectively, of FIG. 3;

FIG. 7 is a sectional view taken along line 7—7 of FIG. 5;

FIG. 8 is a sectional view similar to FIG. 6 but of a modified embodiment of the present invention;

FIG. 9 is a sectional view similar to FIG. 6 but of the modified embodiment illustrated in FIG. 8;

FIG. 10 is a sectional view similar to FIG. 6 but of another embodiment of the present invention; and FIG. 11 is an elevational view of a modified form of bracket employed in the present invention.

Referring now to the drawings, there is illustrated in FIG. 1 an enclosure 10 in which is mounted flow-measuring apparatus 11 embodying the present invention. In the present instance, the enclosure 10 is a conventional manhole of a construction common to sanitary and storm sewers. The manhole has a bottomwall 12 and an upstanding continuously curving sidewall 13. A flow channel 14 for fluid 16 is provided in the bottomwall 12, and a conduit 15 opens into the channel 14 and defines an aperture or passageway 17 in the sidewall 13. In the illustrated embodiment, the fluid flows leftward through the aperture 17 as indicated by the arrows in FIG. 1.

A mathematical relationship exists between the level L of the fluid 16 in the manhole 10 and the rate of flow of fluid in the conduit 15. Thus, by measuring changes in the level L of the fluid 16, the flow rate through the manhole 10 may be computed, and total flow may be computed when time factors are considered. As noted heretofore, existing level-measuring apparatus has not been entirely satisfactory because of the maintenance required to ensure accurate operation.

The present invention avoids the disadvantages of existing level measuring equipment and provides an accurate measurement of the changes in the level L of the fluid 16. To this end, the apparatus 11 comprises a bracket assembly 20 (FIG. 2) which is mounted in the manhole 10 transverse to and above the channel 14 and a hollow, cylindrical housing 21 which is mounted on the bracket assembly 20 to pivot on a substantially horizontal axis disposed transversely to the direction of flow in the channel 14. The housing 21 is pivoted on its axis in response to changes in the level L by means of a float 22 which engages substantially on the surface of the fluid 16 and which is connected to the housing 21 by means of an arm 23. In the absence of flow in the conduit 15, the float 22 rests on the bottom of the channel 14 as indicated in broken lines in FIG. 1; and when the flow in the conduit reaches its maximum, the arm 23 is disposed substantially horizontally, also as indicated in broken lines in FIG. 1.

In accordance with the present invention, the housing 21 is displaced through an included angle of 60° when the arm 23 swings between the no-flow and maximum-flow positions. The displacement of the housing 21 is converted into an electrical signal which is fed by means of a cable 30 to conventional electronic recording instrumentation 31 mounted to the wall 13 of the manhole above the apparatus 11. The flow rate, as well as the total flow, can be obtained from the instrumentation.

In the embodiment illustrated in FIGS. 5–7, the signal is provided by means of a rotary electrical device 35 which is mounted in the housing 21 and which is connected to the instrumentation 31. The device 35 is connected by wires 36,36 through a conventional water-proof connector 37 to the cable 30 to form a component of the instrumentation. The device 35 is the conventional variable type of electrical circuit component, and in the present instance, the device 35 is a variable resistor, although in certain applications variable inductors or capacitors may be desirable. As a conventional variable resistor of the rotary type, the device 35 has an internal stator fixed with respect to its case and an internal rotor rotatable with respect to the stator by means of an external shaft 35a. Low friction bearings mount the shaft 35a in the device 35.

The variable circuit device 35 is securely mounted in the housing 21 so that its stator rotates with the housing 21 and the housing 21 rotates with respect to the rotor shaft 35a. To this end, one end of the device 35 is received in a recess in an endwall 21a of the housing 21, and in the embodiment illustrated in FIG. 7, is clamped in place by means of a plate 38 which is drawn toward the sidewall 21a by threaded fasteners 39,39. If desired, the device 35 may be mounted in the housing 21 by any of a number of commercially-available cements, including epoxy resins, and in such event, the plate 38 and fasteners 39,39 would be unnecessary.

The rotor shaft 35a is secured against rotation to cause the device 35 to produce a signal when the housing 21 pivots with respect to a predetermined datum. In the present invention, the datum is a vertical line through the pivot axis of the housing 21, and the shaft 35a is secured by means of a mass 40 which is fastened to the end of the shaft 35 so as to dispose the greater part of its weight pendulously below the pivot axis of the housing. As best seen in FIG. 6, the datum-detecting mass 40 has a segmental shape in a plane normal to the pivot axis, and the mass 40 is fastened to the shaft 35a by means of fasteners 41,41. Thus, gravity forces acting downwardly on the mass 40 cause it to assume a position substantially as shown in FIG. 7; however, displacement of the float 22 and arm 23 causes the housing 21 to pivot on its axis and the stator of the device 35 to rotate with respect to the shaft 35a for varying the resistance in the instrumentation circuit.

The apparatus 11 of the present invention is readily installed in manholes of various dimensions. To this end, the bracket assembly 20 has a frame member 50 (FIG. 2), the ends of which engage the sidewall 13 of the manhole so that the frame member 50 extends in chordal fashion along the wall 13 (FIG. 3). The frame member 50 is mounted above and transverse to the channel 14 by means of a pair of upstanding adjustable legs 51,51 which are slidably received in journals 52,52 carried on the ends of the frame member 50. The frame member 50 is locked in preselected vertical locations on the legs 51,51 by means of a pair of threaded friction locks 53,53 mounted on each journal 52. The ends of the frame member 50 are maintained engaged against the sidewall 13 of the manhole 10 by means of a tongue 55 which is mounted centrally of the frame member 50 and which extends upstream therefrom to engage the underside of the upper portion of the conduit 15. As seen in FIG. 7, the tongue 55 extends at a right angle away from the frame member 50, and in the illustrated embodiment, the tongue 55 is provided by means of an angle member which is disposed with its edge facing upwardly to engage along a line inside the conduit 15. With this structure, the apparatus 11 is readily and securely installed in the manhole 10 when the tongue 55 is inserted in the conduit 15 and the frame member 50 is raised to its maximum elevation and secured by the locks 53,53.

In order to level the frame member 50 to dispose the pivot axis of the housing 21 horizontally, means is provided to adjust the length of each leg 51. As best seen in FIGS. 2 and 4, each leg 51 comprises an elongated tube 51a which is received in the journal 52 and which threadedly mounts an externally-threaded rod 51b. The rod 51b depends from the bottom of the leg 51 to engage the support surface provided by the bottom 12 of the manhole. An operator 55 is secured to the threaded rod 51b at its upper end. Thus, upon rotation of the operators 55 in selected directions the level of the frame member 50 may be adjusted. For convenience in adjusting the level of the frame member 50, a spirit level 57 (FIG. 2) may be mounted to the frame member 50.

The apparatus 11 of the present invention provides accurate measurements with a minimum of maintenance. However, the apparatus is constructed as to enable the housing 21 readily to be dismounted from the apparatus in the event that it should become necessary to do so. For this purpose, a pair of webs 60,60 (FIG. 7) are welded in spaced relation centrally of the frame member 50 to receive therebetween the endwalls 21a,21a of the housing 21. Each endwall 21a has an axial bore which receives the end of a bearing pin 61, and the bearing pins 61,61 are coaxial with the pivot axis of the housing 21. In the present instance, the bearing pins 61,61 are threadedly received in the webs 60,60, and wrench flats 62,62 are provided on the pins to enable the pins 61,61 to be rotated into and out of engagement with the recesses in the end walls of the housing 21.

In extraordinary situations, the manhole 10 may become surcharged, and the level L of the fluid 16 may rise to an elevation considerably higher than the elevation of the housing 21. In order to prevent the arm 23 from being displaced upwardly and rearwardly beyond the vertical datum line, stop means is provided on the housing 21 to cooperate with the bracket assembly 20 to limit pivotal movement of the housing 21. As best seen in FIG. 5, the stop means includes a stud 65 which protrudes radially outward from the housing 21 a sufficient distance to engage the top edge 50a of the frame member 50. The stud 65 is located on the housing 21 so as to engage the edge 50a of the frame member 50 as illustrated in broken lines in FIG. 5 before the arm 23 reaches a vertically-disposed position. Thus, the arm 23 is biased by gravity forces to ensure continuous engagement of the float with the fluid.

Depending upon the friction in the electrical circuit device, it may be desirable to augment the gravitational forces on the pendulous mass. For this purpose, a modified embodiment of the present invention is provided with magnetic means to maintain the rotor stationary. As seen in FIGS. 8 and 9, a housing 121 is provided of a material permeable to magnetic flux, such as aluminum. One pole, for instance the north pole of a permanent magnet assembly 70, is mounted on a pendulous mass 140, and another or south pole of the magnet assembly is mounted to a frame member 150. The poles of the magnetic assembly 70 are located close enough to one another so as to be mutually attracted to one another by well-known magnetic principles. Thus, when the housing pivots on its axis, the interaction of the poles of the magnetic assembly 70 operates to maintain stationary the pendulous mass 140 and hence to secure the shaft of the electrical circuit device against rotation.

In another embodiment of the present invention as best seen in FIG. 10, a modified device 235 is provided to produce an electrical signal in response to pivotal movement of a housing 221 in which the device is mounted. In this embodiment, the device includes a hollow arcuate container 235a which is mounted along the curved inside wall of the housing 221 below its pivot axis. An electrically-conductive mass, in the present instance a quantity of liquid mercury 240, is provided in the container 235a, and the mercury 240 normally assumes a position at the lowermost level in the container 235a. An electrical conductor 234 is mounted in the container 235a and normally underlies the mercury 240 so as continuously to be engaged thereby. A series of other conductors 236,236 are mounted at spaced intervals along the top of the container 235a and depend therefrom so that selected ones are engaged by the mercury 240 depending on the angular relation of the container 235a and the mercury 240. Thus, with this structure, pivotal movement of the housing 221 on its axis causes the mercury 240 to complete a circuit between the conductor 234 and an individual one of the series of conductors 236,236. Although reference is made to a conductor, it should be understood that conductors of various resistivity may be employed depending on the desired output of the device. A further embodiment of the present invention is provided with a modified bracket assembly 120. As best seen in FIG. 11, the modified bracket assembly 120 has a frame member 151 which overlies and extends in the direction of the channel in a manhole 110. In this embodiment, the ends of the frame member 151 engage the sidewall 113 of the manhole at spaced locations which confront and are opposite one another, and the frame member 151 is held in place by friction forces applied to the sidewall 113 by means of an adjustable extension which operates to vary the distance between the ends of the frame member 151 for applying pressure to the sidewall 113. In the present instance, the adjustable extension is provided by legs 150a and 150b which are telescopically mounted to the frame member 151. The left leg 150a is adjustable in increments by means of a removable pin 151' which engages in selected ones of a series of longitudinally-spaced through bores to provide coarse adjustment of the frame member 151. The right leg 150b is infinitely adjustable by means of a knob 152 which operates upon rotation in opposite directions to extend or retract the leg 150b. The frame member 151 has a depending support element 154 slidably mounted thereon, and the support element has a tongue extension 155 which extends beyond the right-hand end of the frame member 151 to engage in an aperture 117 in the sidewall 113 of the manhole 110 in the same manner as the tongue 55 in the embodiment of FIGS. 1-7. A housing 111, similar to the housing 11, underlies the frame member 151 and is secured to a vertically-depending portion of the support element 154. The housing 111 and support element 154 are locked in selected positions on the frame member 151 by means of a friction lock 156. With this structure, the level-sensing apparatus may be installed readily in proper operating relation in the manhole 110 when the frame member 151 is raised to its uppermost position, the tongue extension 155 is engaged in the aperture, and the legs 150a and 150b are adjusted to engage firmly against the sidewall 113 of the manhole 110.

In view of the foregoing, it should be apparent that there has now been provided improved apparatus which is capable of providing accurate flow measurements with a minimum of maintenance, which is economical to manufacture, and which is relatively simple to install. Moreover, the apparatus has a housing which is completely sealed against penetration of fluid. Thus, there is no chance of electrical apparatus inside the housing being damaged by corrosive fluids. Hence, the flowmeter may be employed satisfactorily in various corrosive environments.

While preferred embodiments of the present invention have been described in detail, various modifications, alterations and changes may be made without departing from the spirit and scope of the present invention as defined in the appended claims.

CLAIMS

1. Apparatus for detecting changes in the elevation of the surface of material in an enclosure and for providing a readout of the changes, comprising:
a housing located in said enclosure,
bracket means mounting said housing for pivotal movement relative to said enclosure on a substantially horizontal axis,
means engaging said material for displacement therewith in response to changes in the elevation at the surface of the material,
an arm connecting said material-engaging means to said housing to cause pivotal movement of said housing on its axis in response to said changes in the elevation of the material, datum detection means contained within said housing and mounted against substantial displacement relative to said enclosure, said datum detection means including a mass, low-friction means mounting said datum detection means to permit displacement of said housing relative thereto, said low-friction means mounting a major portion of said mass below said axis so that gravity forces on the mass act along a line through the axis, and electrical circuit means mounted in said housing and associated with said datum detection means to produce an electrical signal in response to said displacement of said housing relative to said datum detection means, said electrical circuit means including a stator element fixedly mounted to said housing, a rotor element mounted for displacement relative to said stator element, a shaft connected to said rotor, said datum detection means being fixed to said shaft so that the stator pivots with the housing and the datum detection means prevents rotation of the shaft to cause the stator to be displaced relative to the rotor.

2. Apparatus according to claim 1 wherein said electrical circuit means includes a variable resistor comprising said rotor and said stator, said variable resistor being mounted in said housing with said shaft being substantially co-axial with the pivot axis of the housing, said datum detection mass depending pendulously from said shaft, to restrain said shaft and rotor from rotating when the housing pivots on its axis.

3. Apparatus according to claim 1 wherein said datum detection means includes complementary magnetic elements associated with said rotor element and said bracket means, one element being carried by said rotor element in said housing and the other element being carried by said bracket outside said housing, said housing being fabricated of material permeable to magnetic flux, whereby the rotor is secured against rotation with the housing by the interaction of the magnetic elements.

4. Apparatus for detecting changes in the elevation of the surface of material in an enclosure and for providing a readout of the changes, comprising:
 a housing located in said enclosure,
 bracket means mounting said housing for pivotal movement relative to said enclosure on a substantially horizontal axis,
 means engaging said material for displacement therewith in response to changes in the elevation at the surface of the material,
 an arm connecting said material-engaging means to said housing to cause pivotal movement of said housing on its axis in response to said changes in the elevation of the material,
 datum detection means contained within said housing and mounted against substantial displacement relative to said enclosure, said datum detection means including a mass,
 low-friction means mounting said datum detection means to permit displacement of said housing relative thereto, said low-friction means mounting a major portion of said mass below said axis so that gravity forces on the mass act along a line through the axis, and
 electrical circuit means mounted in said housing and associated with said datum detection means to produce an electrical signal in response to said displacement of said housing relative to said datum detection means, said mass being an electrically-conductive liquid and including an arcuate container containing said mass, said electrical circuit means including electrical conductors disposed in said container along the path of movement of the mass, one of said conductors underlying said mass and extending continuously along said path of movement, and including a series of other conductors spaced from one another along said path and overlying said first-mentioned conductor so that the mass completes a circuit between the continuous conductor and a selected one of the conductors in the series upon pivotal movement of the housing.

5. In an enclosure having a bottomwall, an upstanding sidewall surrounding the bottomwall, and a channel affording fluid flow through the enclosure, apparatus for use in measuring the flow of fluid through the enclosure, comprising:
 a sealed housing mounted above said channel in said enclosure;
 an arm fixed at one end to said housing and extending downstream therefrom;
 a float connected to the other end of said arm and engaging the fluid for displacement in response to changes in the flow of fluid;
 a bracket assembly pivotally mounting said housing in said enclosure, said bracket assembly including a frame member having ends adapted to engage the sidewall at spaced locations, and means for securing the ends of the frame member in engagement against sidewall, a pair of upstanding webs spaced from one another on said frame member for receiving therebetween endwalls of said housing, coaxial bearing pin means mounted in said webs and engaging the endwalls of the housing to mount said housing to pivot relative to said frame member, and including stop means mounted on said housing and cooperable with said bracket means to limit upward pivotal movement of said housing on its axis;
 electrical circuit means contained in said housing for producing an electrical signal in response to angular displacement of the housing on its axis;
 whereby a change in the level of the fluid in the channel causes the housing to pivot on its axis and the electrical circuit means to produce a signal corresponding to the change in the level.

6. Apparatus according to claim 5 wherein said frame member is disposed transversely to said channel and including leveling legs mounted at each end of said frame member and engaging said bottomwall, said leveling legs including a journal on each end of said frame member, an elongated tube mounted for displacement axially in each journal, lock means for releasably securing said tube in selected locations relative to said journal to provide a coarse level adjustment of said frame member, a threaded rod threadedly engaged within each tube and depending from the bottom thereof to engage said bottomwall, and operator means mounted to each rod to rotate said rod relative to said tube to displace said rod axially therein so that a fine level adjustment is provided upon rotation of the operator means.

7. Apparatus according to claim 5 wherein said sidewall has an aperture opening into said channel and said securing means includes a tongue extending upstream from said frame member to engage in said aperture for mounting said bracket assembly in an upright fashion in the enclosure when the frame member is raised to and locked at its uppermost level while its ends are engaged against the sidewall of the enclosure.

8. Apparatus according to claim 5 including instrumentation remote from said housing for providing a readout of the signal produced in response to changes in the flow rate, and wiring passing through said housing for transmitting said signal from the signal generator in the housing to the remote instrumentation.

9. In an enclosure having a bottomwall, an upstanding sidewall surrounding the bottomwall with locations opposite one another, and a channel affording fluid flow through the enclosure, said sidewall having an aperture opening into said channel, apparatus for use in measuring the rate of flow of fluid through the enclosure, comprising: a sealed housing mounted above said channel in said enclosure; an arm fixed at one end to said housing and extending downstream therefrom; a float connected to the other end of said arm and engaging the fluid for displacement in response to changes in the flow of fluid; a bracket assembly pivotally mounting said housing in said enclosure, said bracket assembly including a frame member spanning between said sidewall locations and having ends adapted to engage the sidewall, said frame member overlying and extending in the direction of said channel, a support element slidably carried on said frame member and depending therefrom, said support element having a tongue portion extending beyond one end of the frame member for engaging in said aperture, said housing being mounted to said support element below said frame member, and means for securing the ends of the frame member in engagement against the sidewall, said securing means including means providing an adjustable extension on said frame member intermediate its ends for varying the distance between the ends and applying pressure to the opposite sidewall locations, electrical circuit means contained in said housing for producing on electrical signal in response to angular displacement of the housing on its axis; whereby a change in the level of the fluid in the channel causes the housing to pivot on its axis and the electrical circuit means to produce a signal corresponding to the change in the level.

* * * * *